United States Patent
Holst et al.

(10) Patent No.: US 7,356,389 B2
(45) Date of Patent: Apr. 8, 2008

(54) VEHICLE DATA SERVICES

(76) Inventors: William Holst, 6782 W. Skylark Dr., Glendale, AZ (US) 85308; David Richard Lee, 1387 Central Ave., Memphis, TN (US) 38104

( * ) Notice: Subject to any disclaimer, the term of this patent is extended or adjusted under 35 U.S.C. 154(b) by 880 days.

(21) Appl. No.: 10/470,624

(22) Filed: Jul. 14, 2003

(65) Prior Publication Data
US 2005/0197748 A1 Sep. 8, 2005

Related U.S. Application Data

(63) Continuation of application No. 10/042,374, filed on Jan. 4, 2002, now Pat. No. 6,671,589.

(60) Provisional application No. 60/268,085, filed on Feb. 13, 2001.

(51) Int. Cl.
G06F 7/00 (2006.01)

(52) U.S. Cl. ............................... 701/3; 701/24; 701/35; 701/36; 244/1 R

(58) Field of Classification Search ............... 455/12.1; 370/343; 701/3, 24, 35–36; 244/1 R
See application file for complete search history.

(56) References Cited

U.S. PATENT DOCUMENTS

| | | | |
|---|---|---|---|
| 3,573,740 A | 4/1971 | Berger et al. | 340/172.5 |
| 5,077,671 A | 12/1991 | Leslie et al. | 364/424.03 |
| 5,079,707 A | 1/1992 | Bird et al. | 364/424.04 |
| 5,307,505 A | 4/1994 | Houlberg et al. | 395/800 |
| 5,410,478 A | 4/1995 | Richard et al. | 364/424.01 |
| 5,424,949 A | 6/1995 | Applegate et al. | 364/424.06 |
| 5,428,650 A | 6/1995 | Pitot | 375/377 |
| 5,761,625 A | 6/1998 | Honcik et al. | 701/14 |
| 5,805,828 A | 9/1998 | Lee et al. | 395/200.79 |
| 5,841,969 A | 11/1998 | Fye | 395/185.09 |
| 5,970,395 A | 10/1999 | Weiler et al. | 455/67.3 |
| 6,047,165 A | 4/2000 | Wright et al. | 455/66 |
| 6,104,914 A | 8/2000 | Wright et al. | 455/66 |
| 6,108,523 A | 8/2000 | Wright et al. | 455/66 |
| 6,148,179 A | 11/2000 | Wright et al. | 455/66 |
| 6,154,636 A | 11/2000 | Wright et al. | 455/66 |
| 6,154,637 A | 11/2000 | Wright et al. | 455/66 |
| 6,160,998 A | 12/2000 | Wright et al. | 455/66 |
| 6,163,681 A | 12/2000 | Wright et al. | 455/66 |
| 6,167,238 A | 12/2000 | Wright | 455/66 |
| 6,167,239 A | 12/2000 | Wright et al. | 455/66 |
| 6,173,159 B1 | 1/2001 | Wright et al. | 455/66 |
| 6,181,990 B1 | 1/2001 | Grabowsky et al. | 701/14 |
| 6,236,365 B1 | 5/2001 | LeBlanc et al. | 342/457 |

(Continued)

*Primary Examiner*—Cuong Nguyen
(74) *Attorney, Agent, or Firm*—Seed IP Law Group PLLC

(57) ABSTRACT

A method and devices are described for wirelessly uploading and downloading data to and from a mobile vehicular platform while within range of a coordinated network of base stations that monitor the location of the vehicle and optimize data throughput using any combination of diversity and beam forming adaptive antenna techniques while the vehicle is on the ground or additionally in the case of aircraft, not only on the ground, but also during take-off, climb, en-route, holding, on-approach, touchdown and roll-out. Particularly, in describing this art, the intent is to address the aspects of a quantifiable vehicle environment, where the vehicle's behavior is predictable, such as in train routes, bus routes, ship dockings and aircraft flight plans.

40 Claims, 7 Drawing Sheets

U.S. PATENT DOCUMENTS

| | | | |
|---|---|---|---|
| 6,275,172 B1 | 8/2001 | Curtis et al. | 340/961 |
| 6,278,396 B1 | 8/2001 | Tran | 342/29 |
| 6,298,092 B1 | 10/2001 | Heath, Jr. et al. | 375/267 |
| 6,353,734 B1 | 3/2002 | Wright et al. | 455/98 |
| 6,385,513 B1 | 5/2002 | Murray et al. | 701/14 |
| 6,438,468 B1 | 8/2002 | Muxlow et al. | 701/3 |
| 6,459,411 B2 | 10/2002 | Frazier et al. | 342/455 |
| 6,477,152 B1 | 11/2002 | Hiett | 370/316 |
| 6,522,888 B1 | 2/2003 | Garceran et al. | 455/456 |
| 6,545,601 B1 | 4/2003 | Monroe | 340/521 |
| 6,546,425 B1 | 4/2003 | Hanson et al. | 709/227 |
| 6,559,812 B1 | 5/2003 | McCarten et al. | 345/2.1 |
| 6,671,589 B2 | 12/2003 | Holst et al. | 701/3 |
| 6,747,577 B2 | 6/2004 | Chakravarty et al. | 340/945 |
| 6,760,778 B1 | 7/2004 | Nelson et al. | 709/246 |
| 6,937,164 B2 | 8/2005 | Thomson et al. | 340/945 |
| 6,952,181 B2 | 10/2005 | Karr et al. | 342/457 |
| 7,197,310 B2 | 3/2007 | Gehlot et al. | 455/440 |
| 7,215,969 B2 | 5/2007 | Benco et al. | 455/456.6 |
| 2001/0033558 A1 | 10/2001 | Matsuki | 370/335 |
| 2002/0111720 A1 | 8/2002 | Holst et al. | 701/3 |
| 2003/0003872 A1 | 1/2003 | Brinkley et al. | 455/66 |
| 2003/0069015 A1 | 4/2003 | Brinkley et al. | 455/431 |
| 2003/0146871 A1 | 8/2003 | Karr et al. | 342/457 |
| 2003/0148736 A1 | 8/2003 | Wright et al. | 455/66 |
| 2003/0182404 A1 | 9/2003 | Saint-Etienne et al. | 709/220 |
| 2003/0222819 A1 | 12/2003 | Karr et al. | 342/457 |
| 2003/0222820 A1 | 12/2003 | Karr et al. | 342/457 |
| 2004/0193732 A1 | 9/2004 | Nelson et al. | 709/246 |
| 2004/0198386 A1 | 10/2004 | Dupray | 455/456.1 |
| 2004/0266457 A1 | 12/2004 | Dupray | 455/456.5 |
| 2005/0185618 A1 | 8/2005 | Friday et al. | 370/331 |
| 2005/0197136 A1 | 9/2005 | Friday et al. | 455/456.1 |
| 2005/0197748 A1* | 9/2005 | Holst et al. | 701/3 |
| 2005/0208952 A1 | 9/2005 | Dietrich et al. | 455/456.1 |
| 2005/0228558 A1 | 10/2005 | Valette et al. | 701/33 |
| 2006/0025158 A1 | 2/2006 | Leblanc et al. | 455/456.2 |

* cited by examiner

VEHICLE DATA SERVICES

CROSS REFERENCE TO RELATED APPLICATIONS

This application is a continuation-in-part of and claims priority under 35 U.S.C. § 120 to U.S. patent application Ser. No. 10/042,374, filed Jan. 4, 2002, now U.S. Pat. No. 6,671,589, entitled 'Method and apparatus to support remote and automatically initiated data loading and data acquisition of airborne computers using a wireless spread spectrum aircraft data services link', which in turn claims priority under 35 U.S.C. § 119(e) to U.S. Provisional Patent Application Ser. No. 60/268,085, filed Feb. 13, 2001.

FIELD OF THE INVENTION

This present invention relates generally to the field of wireless communication and more particularly to the dissemination of data to and from mobile platforms requiring high bandwidth transfers.

BACKGROUND OF INVENTION

Today's telecommunication environment is moving from a static, fixed and reliable base, whose cornerstone is physical connectivity, to a mobile, unwired base that hopes to provide the quality, reliability and comparable data bandwidths of the former. As seen in the evolution of the low bandwidth, ground-based cellular network over the last ten years, that goal may not be attainable other than in theory. The key to reaching the service and reliability levels of fixed land lines depends on providing extensive overlapping coverage across every part of a user coverage area.

As shown during the cellular era, that can be a very difficult requirement to satisfy, since the user does not always remain within the bounds of the most probable coverage area of metropolitan centers, interstate highways, etc. If population patterns persist as they have since the beginning of time, where 100 percent of the world's population has inhabited only fractional percentages of the total landmass, it appears that a compromise is in order. The arrival of the 'hotspot' appears to have changed the landscape for wireless connectivity and the rush is on to huddle the masses of individual users underneath various 'umbrellas', i.e., within range of the nearest access point at logical places where people congregate—football stadiums, coffee shops, airport lounges, hotels and the like.

The logical next step is to make the 'umbrellas' larger and larger until they encompass an entire metropolitan area, with less than optimum residual benefits to the potential millions of non Line of Sight (LOS) users within a large 30 mile coverage area, even using the latest adaptive antenna array and diversity techniques. This is due to the projected deployment of far fewer base stations (compared to an equivalent metropolitan cellular infrastructure) as inferred in the implementations of the IEEE standards 802.16/802.20 for Metropolitan Area Networks (MAN).

Another approach is a combination of limiting the size of the cells and overlapping them throughout the metropolitan area—one of the interpretations of the IEEE 802.16e standard, which is primarily focused on non LOS mobile users. When combined with backhaul capability from the smaller 'hotspot' feeders such as those derived from the IEEE 802.11b/a standards, using 802.16a techniques for backhauling into fixed infrastructure, a positive improvement in bandwidth and less expensive deployment over continued cellular infrastructure expansion is possible within the metropolitan 'umbrella'.

Until deployment and coverage is complete within the MAN coverage area using this method, there will be many holes where dropouts may occur. It would be very likely that broadband quality data transfers would frequently be interrupted early on in this environment. In the case of public safety vehicles requiring critical updates or downloads such as high quality streaming video feeds with minimum latencies, or large transportation vehicles such as trains, busses and aircraft accommodating a multi-user environment over a long period of time, a logical and seamless handoff coordination and connect/re-connect method could be crucial to the MAN's success, particularly when outside coverage areas, both within the network while scaling up deployment and in transitioning between MANs once deployments are considered complete.

Before the goal of providing optimum broadband speeds while roaming between hotspot coverage areas can be reached in a way where deployment can be optimized, the hierarchy within the customer base must first be established. Should deployment be based on the number of individual customers within a metropolitan area, each with a variety of mobile devices requiring frequent updates, and each with a different level of perceived urgency and importance placed on the frequency of updates to their unwired devices? The individual customer may even insist and demand continuous and seamless connectivity. Should you start with the local municipality's needs, or even the federal government's? Is it more critical to provide services for transportation vehicles operating in a controlled or semi-controlled environment, as in the case of busses, trains, planes, ships and public safety vehicles, than it is to cater to the predictably random nature of an individual user, clustered in population enclaves?

In an ideal world the majority of projected users should dictate how and where coverage is required, assuming that coverage would ultimately be pervasive and seamless. One type of technology accommodating one primary type of customer (the individual user) can never meet all demands, due to physical limitations such as accessibility considerations caused by perturbations in the landscape, the clustering tendencies of mankind and many other criteria which demand flexibility, scalability and backwards compatibility to existing infrastructures.

SUMMARY OF INVENTION

The previous invention described methods for wirelessly uploading data required for maintaining proper vehicle configuration and operation, including delivery to any number of vehicle computers and a novel method for handling Flight Operations Quality Assurance (FOQA) and other forms of quality assurance data, such as video and audio. This type of function associated with stored on-vehicle video data will subsequently be called Video Operations Quality Assurance (VOQA) data. This functionality could become desirable due to potential security monitoring requirements imposed upon public transportation vehicles and the like. In addition, data such as vehicle anomaly reports and forms, weight and balance sheets, fuel reports, manuals, vehicle navigation database updates, transportation vehicle schedules and even RF coverage maps, may be highly desirable for the dissemination, reception and control by the Network Operations Center (NOC) appropriately associated with the vehicle. This type of quality assurance data would be categorized as Maintenance Operations Quality Assurance (MOQA).

The aircraft data services link method and apparatus detailed in application Ser. No. 10/042,374, in general provided a mechanism to retrieve data from or transfer data to aircraft computers, either by a remote request initiated from any number of authenticated network-connected clients or automatically. The requesting client could reside on a Wide Area Network (WAN) operatively connected to the aircraft via a wireless spread spectrum link or directly connected to the aircraft Local Area Network (LAN). The method and apparatus could initiate retrievals and data transfers automatically at a designated time interval, based upon report generation criteria stored as an operational program configuration (OPC) file defining reporting criteria and events.

Specifically, the problem of dissimilar physical mediums found on aircraft was addressed, i.e., the inability of ARINC 429 or Ethernet communication enabled computers to connect wirelessly to a NOC and user interface devices. The apparatus' functionality described a bridging function to upload or download data packets in the proper formats for communication between ground stations, aircraft network client devices and aircraft computers. In addition, the capability to operate as a router, server and spread spectrum transceiver was also addressed, along with the NOC's role in command and control of the data. The invention described in the following paragraphs continues in the spirit of the embodiments of the prior disclosure, particularly in its application to mobile vehicular platforms requiring optimum throughput and connectivity for data transfers within the constraints of the vehicle operational envelope and available infrastructure in a less than ideal, non-pervasive wireless mobility environment.

The Vehicle Data Services (VDS) communication system extends the basic concepts of the Aircraft Data Services Link (ADSL) to vehicles operating in a predictable manner, e.g., not only commercial aircraft, which operate according to a flight plan, with designated departure and destination criteria, and all intermediate points (cruise altitudes, heading and heading changes, waypoints, etc.), but also trains, busses, ships and other vehicles, which like people, tend to transition through key locations such as bus depots and transfer stations, railroad stops and terminals and shipping ports. In the case of people, those key locations would equivalently be coffee shops, airport terminals, parks, hotels, etc., areas that have been targeted by service providers for the location of the wireless 'hotspot', although trying to predetermine an individual's arrival at a hotspot may be slightly more difficult than looking at the latest version of a metro bus schedule.

Unlike individuals, these mobile platforms are much more predictable in schedule, time of departure, time of arrival, direction of departure and arrival, speed of arrival, angle of arrival, etc. than is the ordinary individual arriving and departing the 'hotspot'.

Additionally, wireless connectivity may be fairly low in priority during the more often than not, short stay at one of these 'hotspots'. On the other hand, the ordinary individual's behavior, when using any of the forms of transportation mentioned, can also be more easily quantified. In other words metropolitan and regional transportation vehicles provide a captive client base that would benefit from a combination of seamless, periodic broadband speed updates to their mobile network devices when outside a continuously connected wireless environment such as a MAN and continuous coverage while stationary or mobile and within a micro (802.11) or macro (802.16/802.20) cell 'hotspot' base station range.

DETAILED DESCRIPTION

Many of the network architectures existing on vehicles today are not simply Ethernet based due to various considerations. For example, military standards such as MIL-STD-1553 and commercial standards like ARINC 429, take into account factors such as failure immunity, robustness and functional criticality. Alternatively, there currently exist network architectures much faster than the predominant 10/100 baseT Ethernet, like Firewire and USB, which are suitable for data transfers up to 400-800 Mbps.

Equipping a vehicle to handle wireless transfers must take into account the diverse range of pre-existing and alternative communications media used to move data amongst vehicle network devices. The Vehicle Microserver Bridge Router (VMBR) 100, outlined in FIG. 1 allows data transfers across the wireless media, and also the routing 101, bridging 102 and on-vehicle storage 103 104 of any of the static data hosted on inter-vehicle and other operatively connected network devices, data such as operational software updates, maps and other pertinent operational databases, device fault data, performance data and operational reports, etc. that may be stored in existing on-vehicle computers and network equipment. For functionality such as VOQA or MOQA, which may not be associated with an existing vehicle computer, the apparatus can effectively handle the routing and storage onto on-board storage media.

The data content either originates from networked ground station computers or vehicle computers. The invention performs these functions by requesting and retrieving the stored data and emulating a legacy method which would be functionally equivalent to the method described in a previous embodiment of the invention for the ARINC 615 interface 105 113 on commercial aircraft, of which this invention is a continuation. Most vehicle computers in existence today have a limited storage medium such as NVM or EEPROM with various ways to retrieve or overwrite the data, e.g., RS232 serial dump via test connector.

Figure 1A:
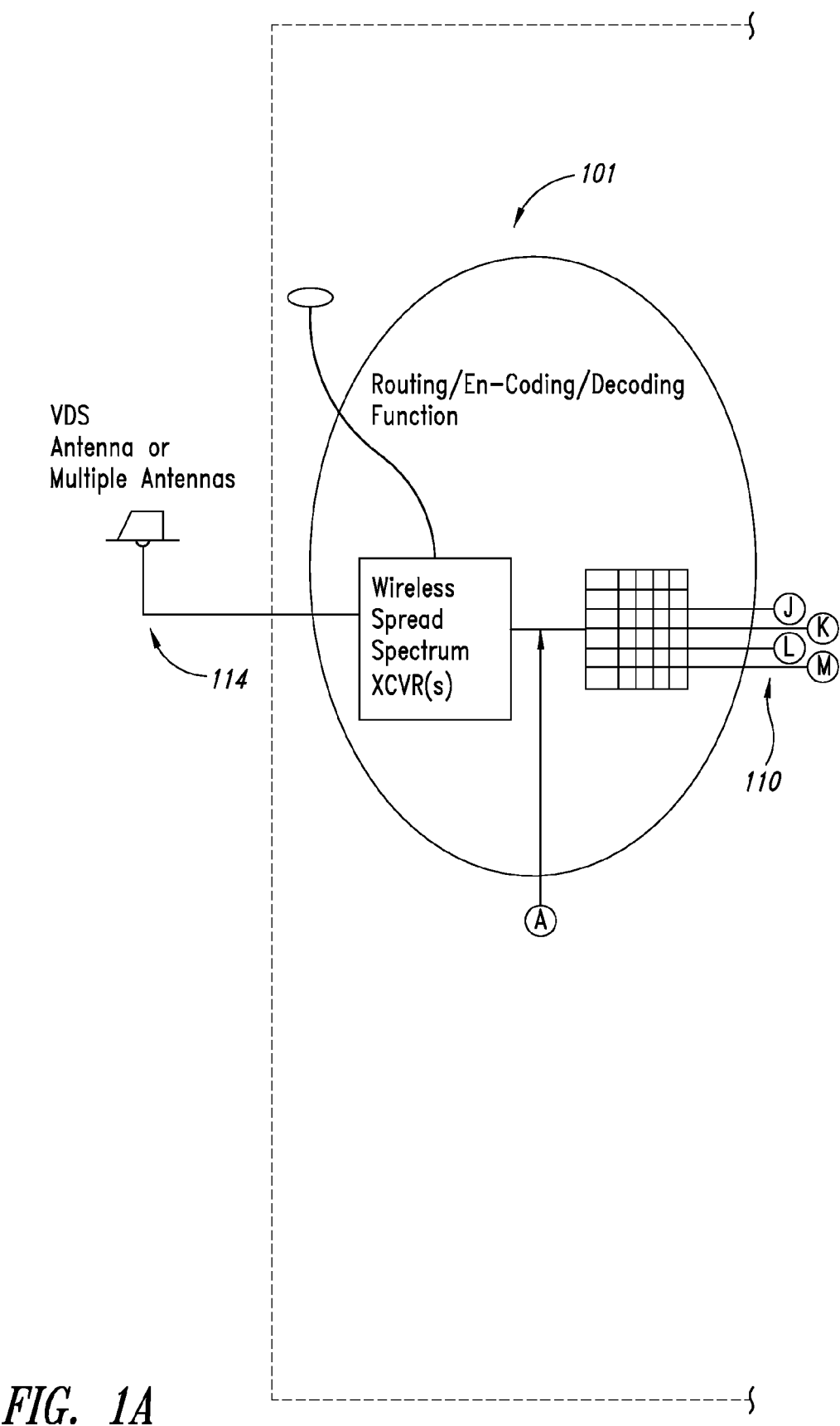
FIG. 1 diagrammatically illustrates the Vehicle Microserver Bridge Router and typical vehicle network interfaces.
Figure 1B:
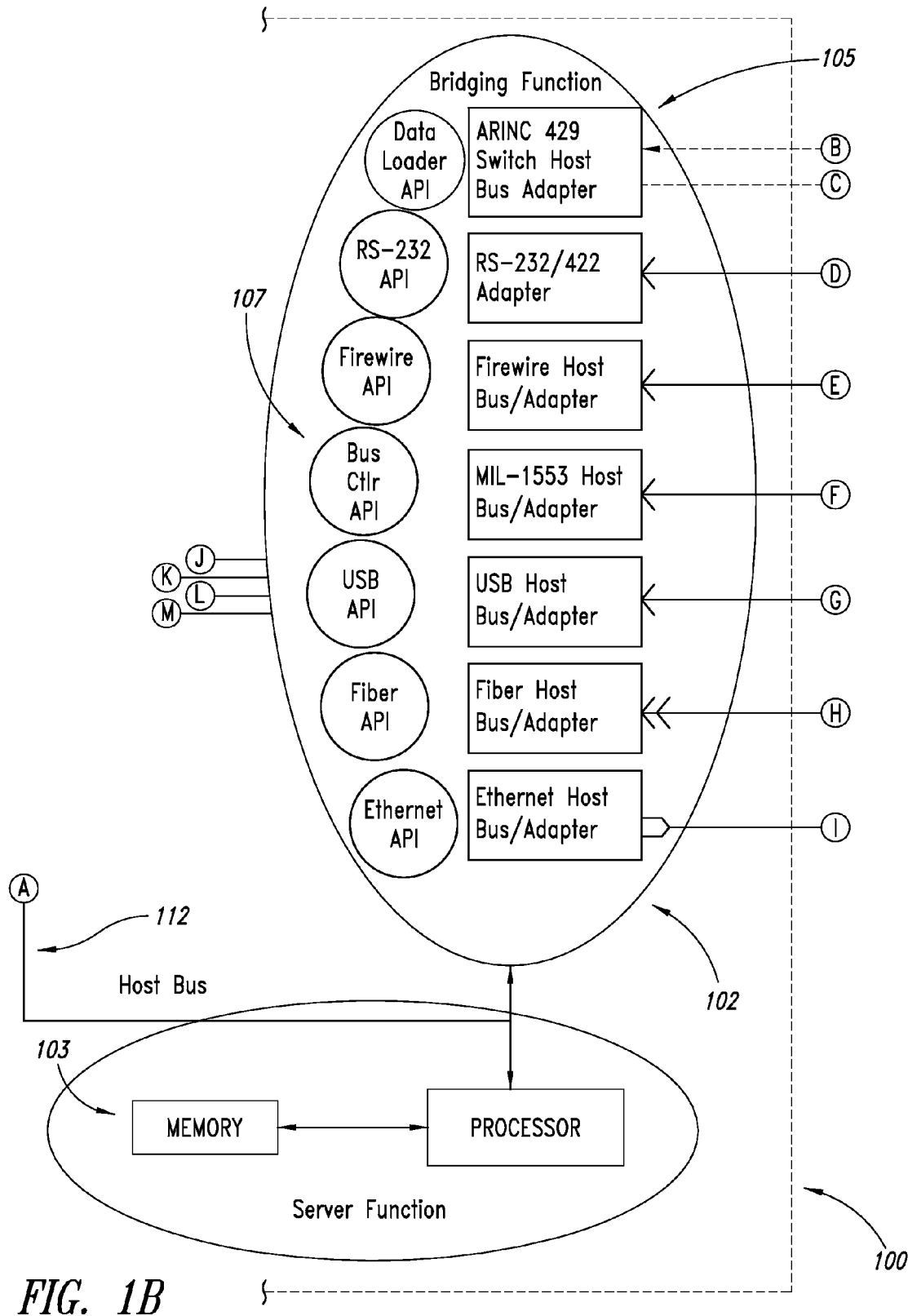
Figure 1C:
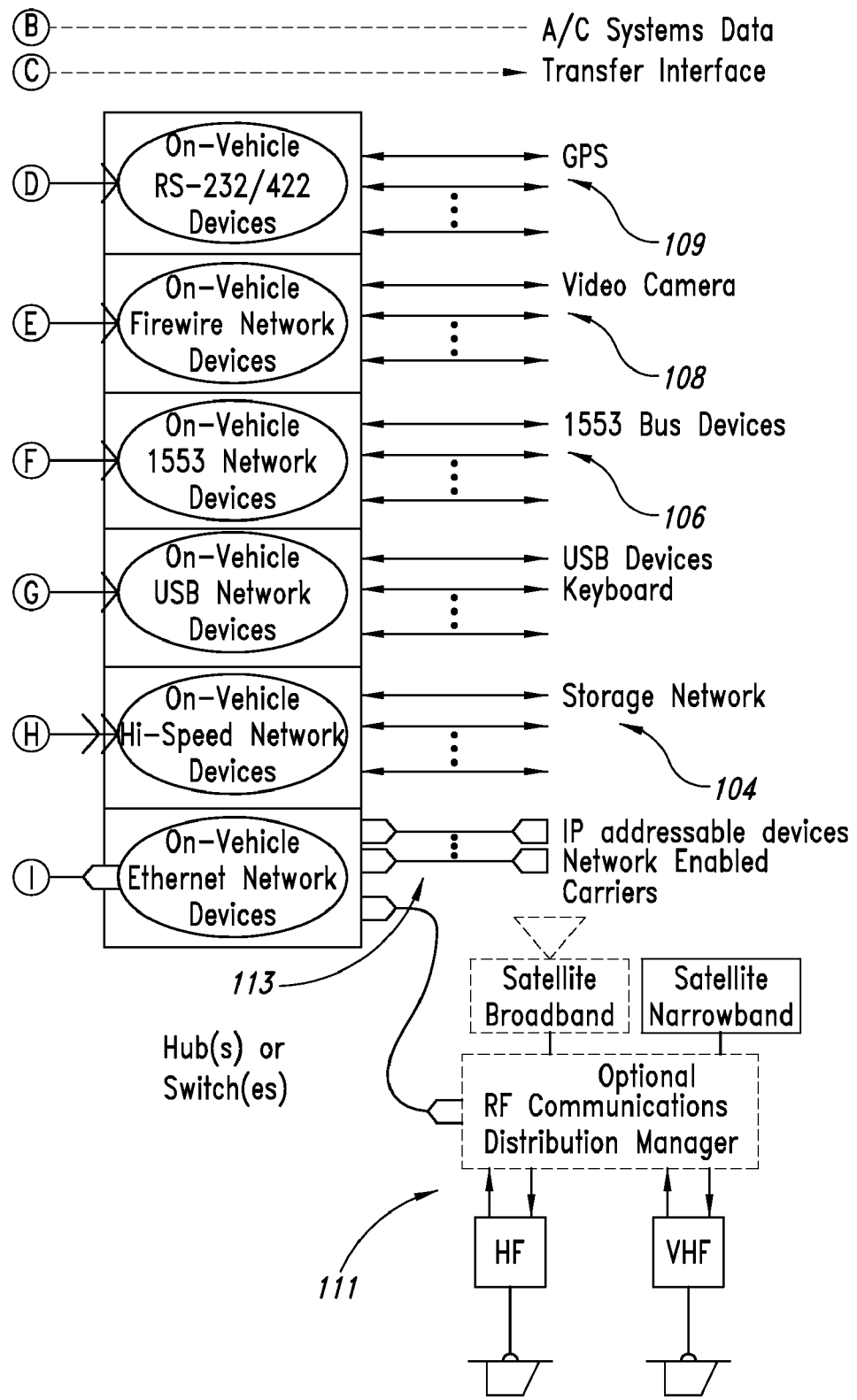
Figure 2:
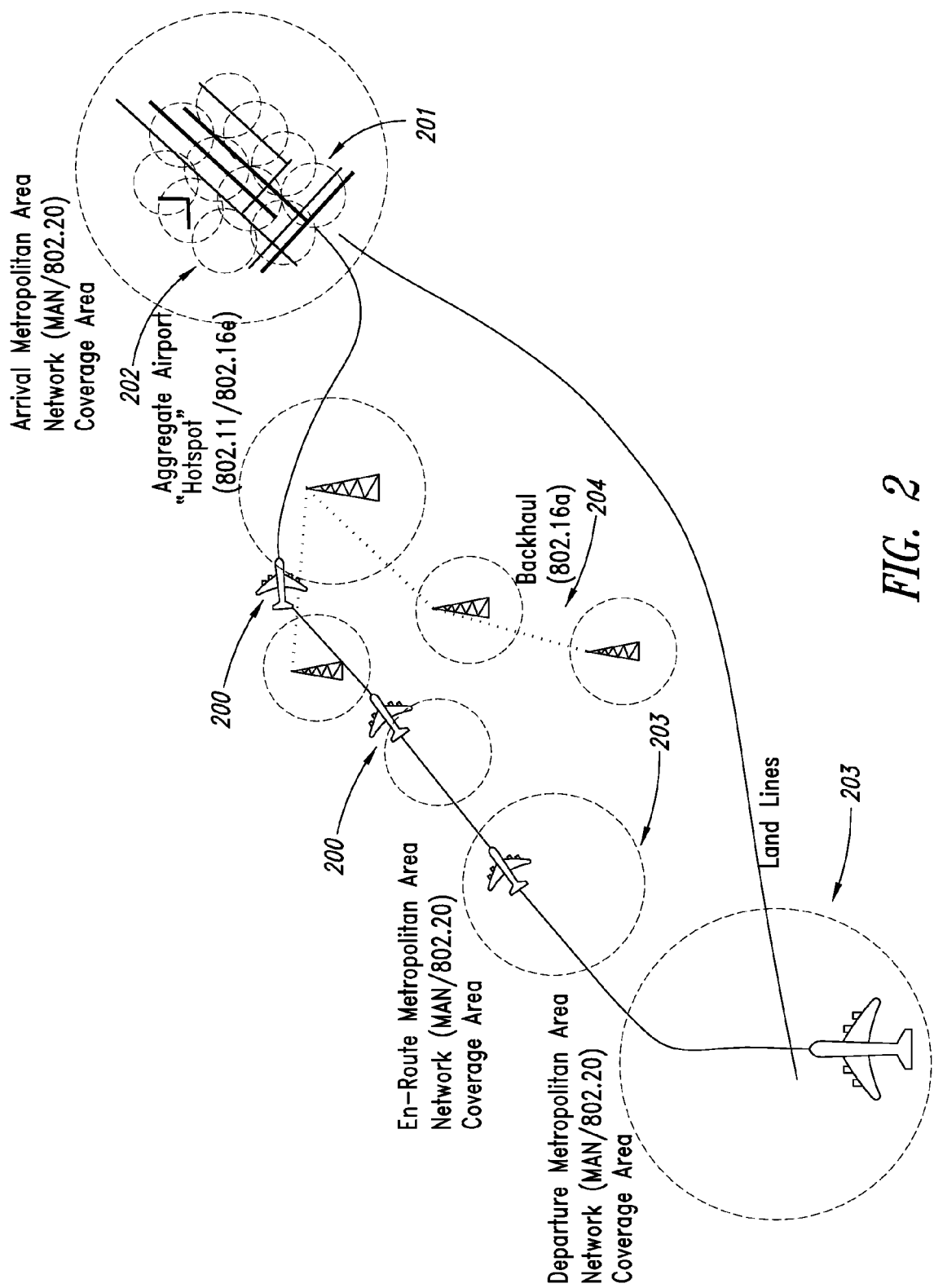
FIG. 2 diagrammatically illustrates various types of Wireless Fidelity (WIFI) hotspots a typical air transportation vehicle on a scheduled flight may encounter during a typical flight profile.
Figure 3:
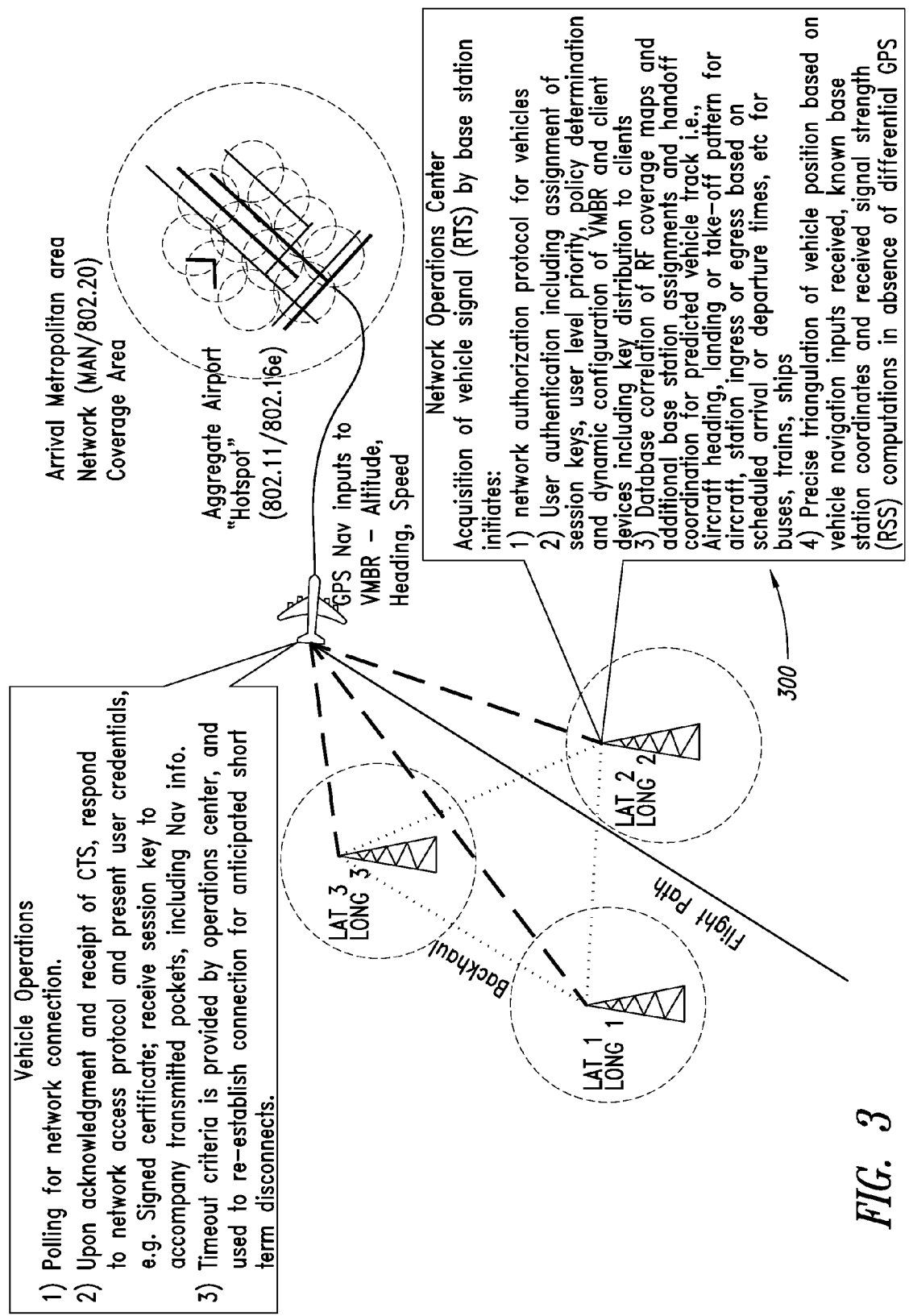
FIG. 3 diagrammatically illustrates the invention in the context of a primary Network Operations Center's initial responsibilities when establishing a wireless connection with the transportation vehicle.
Figure 4:
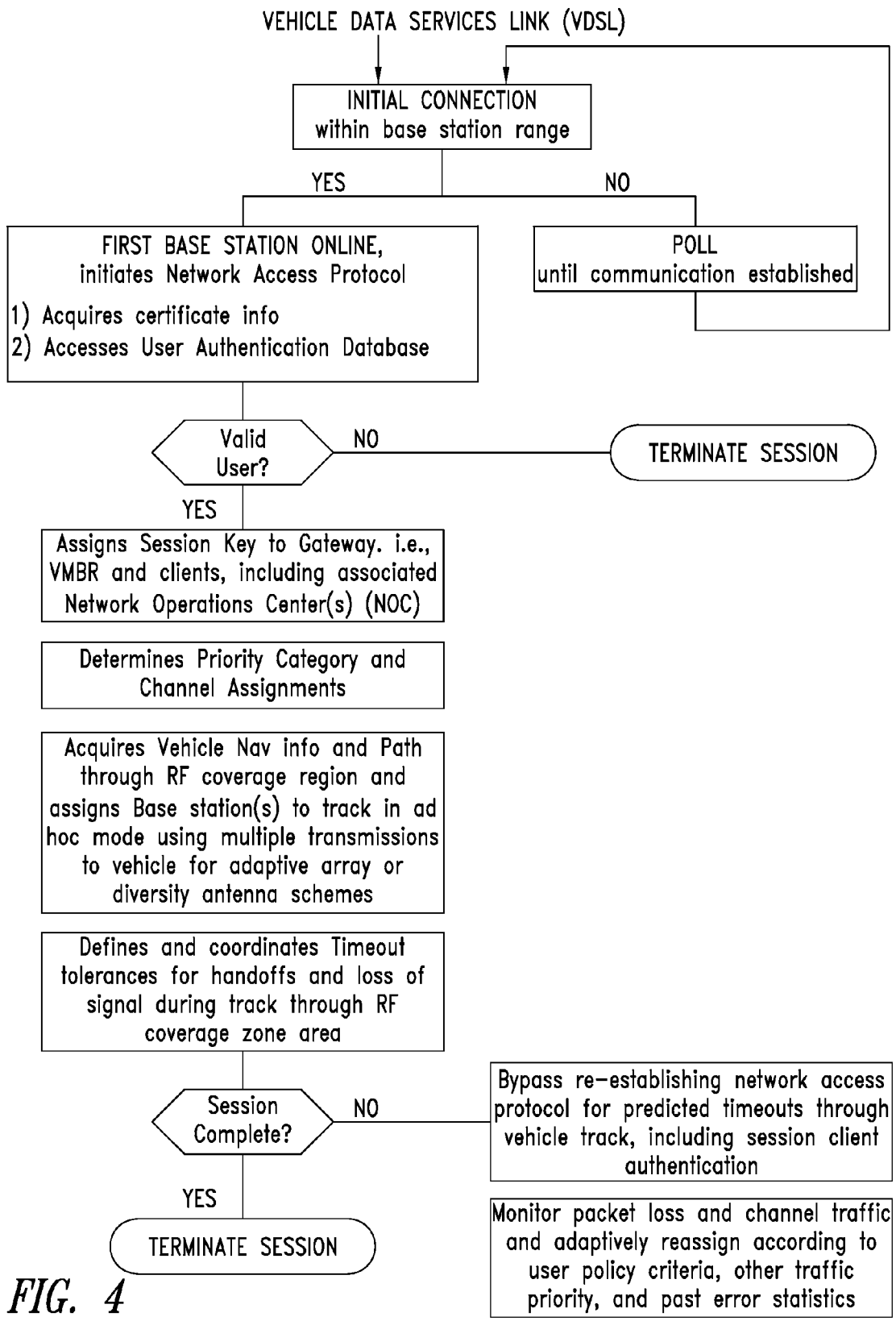
FIG. 4 diagrammatically illustrates the invention in the context of a primary Network Operations Center's continuing responsibilities to optimize bandwidth and minimize reconnection effort until the wireless connection with the transportation vehicle exceeds its timeout criteria or exits the RF coverage zone.
Figure 5:
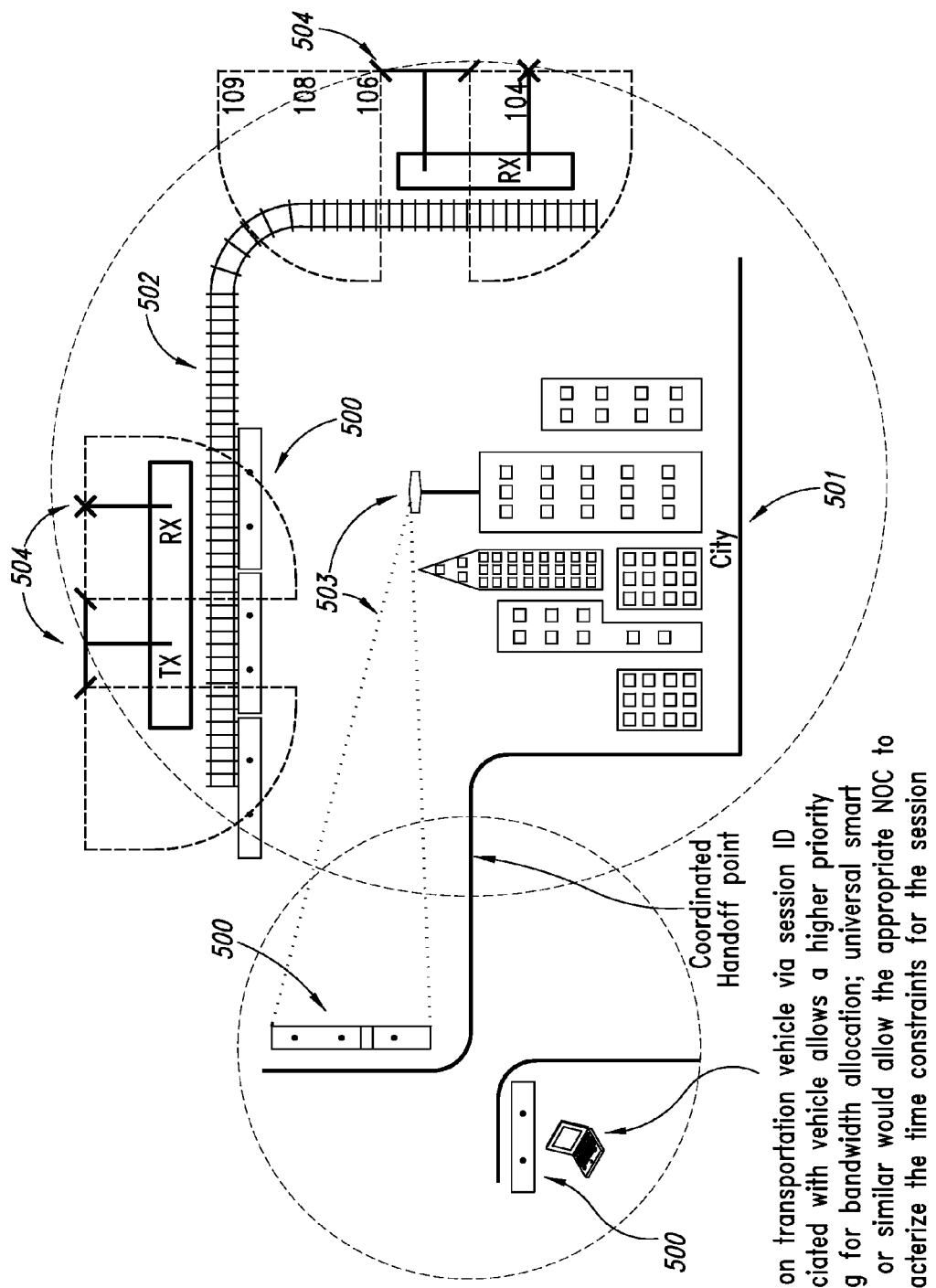
FIG. 5 diagrammatically illustrates the multitude of predictable tracks for ground transportation that can be optimized due to many known factors such as RF coverage maps derived from past error statistics, empirical measurements, predicted arrival and departure times, etc.

An Application Programmable Interface (API) for the many types of vehicle communication bus architectures (as depicted in FIG. 1) conditions the data packets and operates as a query and data transfer engine for each vehicle communication bus interface, working in conjunction with the specific host bus adapter(s) for that device interface(s). In the case of a MIL-STD-1553 bus 106 architecture, for example, the VMBR 100 would emulate a bus controller to poll, request and transfer data to and from devices connected to the 1553 bus 106. Likewise for either a Firewire network 108 or a RS-232 device(s) 109 such as a Global Positioning System (GPS) that requires database updates and also provides periodic outputs that the VMBR can utilize in performing its routing, packetization and communication function.

The methods described are generally non-time deterministic, describing a process to remotely or automatically request or transfer data via a wireless communication link; however, the type of data described falls into the specific category of vehicle operation and performance—typical data structures targeted for movement to and from the vehicle include operational and database program updates to the on-board vehicle computers, stored performance and fault log downloads to ground-based operations centers, etc. One notable data type considered as operational data for download is recorded video and audio data stored on-board as a result of security monitoring or an emergency event, which can be used subsequently at a later time for training purposes and legal substantiation. The VMBR 100 has the additional capability of encoding and decoding, compressing and de-compressing data intended for wireless transmission and reception. This is considered an extension of the routing and data conditioning function that delivers packetized data to the appropriate VMBR interface 110 or interfaces shown in FIG. 1.

The Vehicle Microserver Bridge Router (VMBR) apparatus, an extension of the apparatus described in application Ser. No. 10/042,374, provides a complete on-vehicle direct interface capability to a ground-based spread spectrum communications link, along with interfacing capability to existing on-vehicle RF and satellite communications such as HF, VHF, GPS, narrowband and broadband satellite links. The typical formats include MIL-1553, ARINC 429, Ethernet, RS-232. Optical Fiber, Firewire or a host of other communication bus structures. The apparatus is structured to bridge data to and from its internal host bus architecture 112 to the appropriate vehicle device(s) 110 communication bus format, route and/or store data packets to and from a NOC 300 via a wireless data link 114 and the transportation vehicle 200 500. Appropriate application layer information to accompany the wireless link data packets that assist in maximizing bandwidth, both on the ground station platform and vehicle platform, will be discussed in the following paragraphs.

The apparatus' primary function is to properly handle data updates or downloads required for a particular on-vehicle device or computer connected either directly, through a hub/switch or series of hubs/switches, or if an on-vehicle wireless LAN is installed, any devices operatively connected to such a LAN. A download is defined as a vehicle to NOC wireless transfer of data packets from an on-vehicle network device to a NOC, with the intermediate step of bridging, routing and/or storing the packets of information on-board the vehicle for later retrieval, depending on predetermined priority criteria, such as an emergency situation declared, company policy and procedures, automatic report generation, etc., which requires a level of on-vehicle backup and redundancy.

An embodiment of the invention that utilizes transmission/reception techniques such as Multiple Input Multiple Output Orthogonal Frequency Division Multiplexing (OFDM) being currently developed for fixed Non Une of Sight general users at distances up to 40-50 kilometers could be applied to the Vehicle Data Services link in a novel way. The following 'stores', 'data flows' and 'data manipulations' would be required:

Vehicle/NOC Reference Databases
  1) GPS database (if available, for use by operatively connected vehicle clients)
  2) Route Plans and Schedules; for land vehicles, estimated or actual departure and arrival times, distance to and distance from intermediate waypoints; for aircraft, navigation databases with entered flight plan, if available
  3) RF coverage maps (if available, for use by operatively connected vehicle clients)

Vehicle to NOC Data
  1) User Category/Emergency category
  2) Track, Altitude, speed, geographical coordinates (aircraft), rate of climb/descent, if available; direction, speed and coordinates (land vehicles)
  3) Vehicle Users, if known through methods such as smart card presentation upon entry; Default user policy criteria status is assigned by the appropriate lower level User NOCs for those who have not customized their preferences prior to going mobile.

NOC to Base Station Data
  1) Scheduled vehicle traffic through coverage area and handoff coordination
  2) Projected priority level, updated upon acknowledgement of connection
  3) Multiple base station assignment to vehicle along route, if applicable and depending on priority level, for handoff coordination.

Base Station Applications
  1) Iterative correction for geographic position errors when multiple base station coordination is available (triangulation method using Received Signal Strength (RSS) from vehicle) against vehicle position output
  2) Adaptive channel management and multiple base station transmissions when multiple input multiple output polarization diversity antennas and associated signal modulation and processing techniques are applicable.
  3) Transmit Power variation along with beaming forming for adaptive array antennas, if ability exists to follow predicted track and adjust beam direction and strength to achieve best Bit Error Rate. As track exceeds range of coverage, appropriate handoff would occur based on NOC information.

The base station assesses user bandwidth allocation and priority. For example, coordinated two-tiered priority system (USER/EMERGENCY) could be handled at the wireless link application layer. Establishing excessive hierarchical dependency structures at the NOC should not be required for the user/NOC/data type relationship with this simplified structure. The number of NOCs associated with the top three levels should always be very small compared to the potential number in Levels IV and V. The dumping of bandwidth for general category users theoretically would only occur at the access points currently activated for communicating with the vehicle.

A hierarchy for bandwidth allocation is suggested. On the ground station side, this consists of choice of signal path or paths between base station networks and user and the use of adaptive antenna beam focusing and signal strength adjustments 503 and/or multiple diversity antenna placements 504.

Priority—Users
I—Public Safety Vehicles—EMS, Law Enforcement, Fire Department
II—Regional Transportation Vehicles—Trains, Regional busses, Air Carrier aircraft, Ships
III—Municipal Vehicles—Metro busses, Taxis
IV—Private Vehicles
V—Individual Users Priority—Emergency
I—National Security—Terrorist Alert
II—Regional Alert—e.g., Amber Alert, All Points Bulletin, Regional Transportation Vehicle (malfunction, medical, on-board incident)
III—Municipality Alert—Public Safety Alert, Environmental Alert
IV—Security and Surveillance
V—No Emergency An embodiment of the invention is presented where optimum bandwidth is desired on predictable, repeatable vehicle routes, at a time when MAN deployment is assumed to be in its infancy, i.e., total area coverage continually scales up, but is never completely pervasive, with the assumption that there is no overlapping coverage between MANs. The MAN is assumed to be a mix of small range, individual, enterprise 'hotspots', larger range mobility hotspots using any combination of diversity and adaptive antenna arrays and even wider area metropolitan area coverage hotspot or hotspots, which provide generic coverage when localized coverage has either been redirected or is not available to individual user.

The following is an example of how the two-tiered priority system would be handled: A regional bus carrier has just entered Manhattan across the George Washington bridge from New jersey when an unruly passenger becomes a source of concern to the safety of the driver and other passengers. The driver declares an emergency via a panic button that activates 2 Firewire 800 (800 Mb throughput) cameras, along with a broadcast of the vehicle's GPS position. Due to the fact that this is a public safety alert, in addition to the routing of the vehicle data to the bus carrier's central NOC, the NYPD NOC would take over operational control, thereby categorizing the User Priority at the highest level and the Emergency Priority at the second highest level, due to the fact that a regional transportation vehicle is involved. This situation would constitute the highest level two-stage priority defined (outside of an on-going or imminent terrorist attack), meaning that all available bandwidth resources would be directed for use by users associated with the alert, including local hotspots within range of the vehicle and its priority users (802.11b/a) 201, MAN coverage (802.16e, 802.20) 202 203 and backhaul coverage (802.16a) 204.

A base station setup embodied onto a vehicle such as a helicopter could create a portable and mobile base station function to perform as an access point with backhauling capability. As an example, in responding to a major municipal incident, the mobile base station could allow immediate communication access, including video feeds to public safety NOCs or even a news station from individuals using mobile wireless cameras, e.g., at a major fire, where the location may be obstructed by large buildings on all sides.

It has previously been established that critical vehicle operations data such as FOQA, MOQA and VOQA and its dissemination and control is addressed in the preferred embodiments of this invention. These data types are not time constrained, as they should be recorded and stored on-board vehicle computers for convenient delivery when within range of an access point, according to the particular responsible NOC's data distribution and usage procedures.

Occasionally, there are emergency or procedural situations where the data delivery becomes more urgent and low-latency, handoff management and range extension is required, e.g., upon landing of an aircraft may require extensive data downloads with only a short turn around prior to the next departure.

Although vehicle storage should always be active for later retrieval, another added benefit during the unlikelihood of a potentially catastrophic event—that a video/audio stream, VOIP or vehicle performance data could be transmitted to ground stations by extending the wireless link to the vehicle platform using the methods described in previous paragraphs and exemplified in FIGS. 2-5. Eventually a flight or bus trip across country could intersect active WiFi coverage areas that only require a coordinated handoff mechanism and extended antenna diversity and adaptive antenna array systems to minimize dropouts of data seen at the vehicle. Until that occurs, the proposed system and method can provide session updates (NOC/Vehicle/Base Station) while a vehicle of interest follows a predicted track 205 501 502 within the vicinity of an access point, i.e. base station(s).

That which is claimed is:

1. A vehicle data services communication system for uploading data to a vehicle, said communication system comprising:
   an uplink communication path configured for wireless link transmissions of data to at least one vehicle, said communication path including:
   a primary network operations center (NOC) communicatively coupleable to the at least one vehicle and having a data source, wherein said NOC manages configuration control and distribution of data contained in said data source;
   one or more primary base stations operatively connected to said primary NOC, wherein said primary NOC is adapted to dynamically assign or de-assign said base stations to said at least one vehicle by to allow communication of the data between the primary NOC and said at least one vehicle;
   a vehicle Local Area Network (LAN) located in said at least one vehicle and having a plurality of disparate vehicle network devices that can be operatively connected to said primary NOC; and
   one or more input and output antenna configurations at vehicle and base station ends of the communication path, wherein said antenna configurations support any number of wireless spread spectrum modulation schemes that can be used to transmit data to said at least one vehicle.

2. A vehicle data services communication system according to claim 1, wherein the said primary NOC comprises a master control NOC, and wherein other operatively connected communication path components, including said at least one vehicle and said primary base stations, comprise slave devices to said master control NOC.

3. A vehicle data services communication system according to claim 1, wherein said one or more primary base stations is in direct communication with said at least one vehicle.

4. A vehicle data services communication system according to claim 1, further comprising one or more secondary base stations, said secondary base stations not in direct communication with said at least one vehicle until reclassified by said master primary NOC to one of said primary base stations.

5. A vehicle data services communication system according to claim 1, wherein said one or more primary base stations are located in micro cell RF coverage areas configured as 802.11 hotspots, each hotspot utilizing a wireless transceiver configured to relay data to vehicles within range by way of said communication path between said primary NOC and said at least one vehicle.

6. A vehicle data services communication system according to claim 1, wherein said one or more base stations are located in one or more macro cell RF coverage areas configured as 802.16/802.20 Non Line of Sight (NLOS) hotspots.

7. A vehicle data services communication system according to claim 6, wherein said base stations provide wireless backhauling capability.

8. A vehicle data services communication system according to claim 1, wherein said antenna configurations comprise adaptive antenna array antennas or polarization antennas or a combination of both.

9. A method for providing a dynamic assignment of one or more base stations to each vehicle associated with a master primary network operation center (NOC), said method comprising:
   receiving, at one or more base stations, a polling request from a vehicle for connection to a NOC, said receiving initiating a network authorization protocol between said vehicle and one of said base stations with a strongest Received Signal Strength (RSS) signal;
   relaying vehicle user information for user authentication purposes to the primary NOC from said base station with the strongest RSS, including relaying said information through an optimum ground network path using wireless backhauling;
   establishing a communication link between the vehicle and the primary NOC if the vehicle is authenticated, including assigning one or more primary base stations in active communication with the vehicle while in a RF coverage area range.

10. A method according to claim 9, wherein establishing said communication link between the vehicle and the primary NOC further comprises:
    assigning a vehicle user/emergency priority status for the communication link;
    predicting a track of the vehicle through RF coverage zones in proximity to the vehicle, including correlating to an RF coverage database having a software updateable statistical database or signal strength map with uploadable or downloadable data;
    using past error statistics and correlation with the predicted vehicle track to dynamically adjust and update user session timeout tolerances through low signal strength hotspot areas;
    utilizing navigation information from the vehicle in calculating assigning and de-assigning of base stations along the projected vehicle track; and
    establishing handoff to a next one or more primary base stations along the predicted vehicle track if a mean value RSS from a next assigned primary base station is increasing and exceeds a current primary base stations' mean value RSS.

11. A method according to claim 10, wherein said navigation information is derived from vehicle located GPS outputs received by said primary NOC.

12. A method according to claim 10, wherein the navigation information is derived from either a GPS or flight plan and flight management computer navigation outputs, and wherein the vehicle comprises an aircraft.

13. A method according to claim 10, wherein assigning a priority status comprises any one or more of:
    evaluating network bandwidth traffic between the vehicle and the primary NOC from the one or more primary base stations and from intermediate network nodes operatively connected to said vehicle, and performing adaptive multiple base station broadcasting to said vehicle depending on location of the vehicle and the evaluated network traffic;
    categorizing data to be transmitted into a user priority ranking, wherein said user priority ranking includes a plurality of differentiable levels, including public safety, regional, municipal, private vehicle and individual users;
    categorizing data to be transmitted into an emergency level priority ranking, wherein said emergency level priority ranking includes a plurality of differentiable levels, including national, regional, municipal, security and surveillance and no emergency;
    combining the two-tiered ranking to calculate an overall priority ranking, wherein (I,I) is the highest and (V,V) is the lowest; and
    monitoring packet loss and channel traffic to adaptively reassign data channel distribution, multiple transmission, and reception to minimize transfer latencies, wherein said reassignment is dependent on user policy criteria, other traffic priority, and past error statistics.

14. A method according to claim 13, wherein categorizing data to be transmitted into the user priority ranking includes configuring transportation session information into a user priority ranking equivalent to the said vehicle priority ranking for a length of a session.

15. A method according to claim 13, wherein evaluating network bandwidth traffic is alternatively tasked between at least one of the primary base stations and the primary NOC.

16. A method according to claim 13, wherein evaluating network bandwidth traffic comprises said assigned one or more primary base stations operating in an ad-hoc infrastructure mode to support multiple output transmissions to the vehicle.

17. A method according to claim 13, wherein evaluating network bandwidth traffic comprises adjusting signal strength and beam focusing when adaptive array antennas with beam focusing provide wireless communication at said assigned one or more primary base stations.

18. A method according to claim 13, wherein evaluating network bandwidth traffic comprises said primary NOC coordinating beam focusing adjustments along the predicted vehicle track using triangulation information from multiple primary base stations as a function of known positions and RSS readings at said base stations to correct for slight vehicle navigation output errors when an on-ground differential GPS system is not available.

19. A vehicle data services communication system for downloading data from a vehicle to one or more primary base stations, said communication system comprising:

a downlink communication path configured for wireless link transmissions of data from at least one vehicle, said communication path including:
- means for providing a polling signal for a base station to respond to a request for access to a network having a network operations center (NOC) configured to authenticate vehicle user credentials, said polling signal containing at least vehicle identification information for user identification;
- means for communicating with a first responsive base station with a compatible network access protocol;
- means for sending priority status to a NOC designated as master wherein said master NOC validates the vehicle and assigns session keys to operatively connected network nodes including clients that are activated in a downlink session to said master NOC; and
- means for receiving a timeout tolerance parameter from said master NOC, wherein said parameter is used to bypass re-establishment of handshaking and authentication processes during link loss and during a valid session that provides said data including navigation updates, signal strength measurements, user policy criteria, and past error statistics from disparate devices on the vehicle to the master NOC, wherein said provided data is usable by the master NOC for optimizing data distribution to the vehicle.

20. A vehicle data services communication system according to claim 19, wherein said data provided by the vehicle further comprises automatic or remotely initiated data transfer of vehicle Maintenance Operations Quality Assurance (MOQA) data.

21. A vehicle data services communication system according to claim 19, wherein said data provided by the vehicle further comprises automatic or remotely initiated data transfer of vehicle Video Operations Quality Assurance (VOQA) data.

22. A vehicle data services apparatus for operatively connecting at least one vehicle local area network (LAN) to a base station for controlled data transfers, said apparatus comprising:
- means for uploading data from on-ground network nodes to a vehicle LAN device, wherein said uploading is automatically initiated or manually initiated under control of a network operation center (NOC);
- means for downloading data to the on-ground network nodes from the vehicle LAN device, wherein said downloading is automatically initiated or manually initiated under control of the NOC; and
- means for bridging data from a plurality of dissimilar vehicle LANs, wherein said bridging is automatically initiated or manually initiated under control of the NOC.

23. An apparatus according to claim 22, wherein said means for bridging includes FireWire LAN devices and associated Application Programmable Interfaces (APIs).

24. An apparatus according to claim 22, wherein said means for bridging includes MIL-1553 bus devices and associated APIs.

25. An apparatus according to claim 22, wherein said means for bridging includes RS-232/RS422 bus devices and associated APIs.

26. An apparatus according to claim 22, wherein said means for bridging includes USB devices and associated APIs.

27. An apparatus according to claim 22 wherein said means for bridging comprises at least one bus device and an associated API.

28. An apparatus according to claim 22, further comprising means for routing data to and from on-vehicle and on-ground network nodes, wherein said routing includes video and audio codecs processing, data encryption, data sequencing for multiplexed or multiple transmissions if a plurality of antennae are used for communication, user certificate presentation, user policy information, and session key data packet tagging.

29. An apparatus according to claim 22, further comprising means for storing data in the vehicle, wherein said downloading includes said bridging prior to storing data originating from the dissimilar vehicle LANs.

30. A vehicle data services communication system according to claim 1 wherein said vehicle is an authenticated user authorized to receive data from either the primary NOC or one of the base stations, the system further comprising a user authentication storage device operatively coupled to the NOC to store credentials associated with the vehicle and usable to authenticate the vehicle to receive data.

31. The vehicle data services communication system according to claim 1 wherein at least some of said base stations include mobile base stations.

32. The vehicle data services communication system according to claim 1, further comprising:
- one or more secondary NOCs operatively coupled to said primary NOC; and
- one or more portable network devices operatively coupled to at least one of said secondary NOCs, to said vehicle LAN, or to at least one of said base stations.

33. The vehicle data services communication system according to claim 1 wherein one of said wireless spread spectrum modulation schemes include MIMO OFDM.

34. A vehicle data services communication system to communicate information data between a vehicle and a network location, the system comprising:
- a vehicle network device located in the vehicle and which can be communicatively coupled to a plurality of disparate units in the vehicle that respectively provide data; and
- a communication device coupled to the vehicle network device to wirelessly send the data provided by the units to a network operations center (NOC) by using a wireless spread spectrum technique to send the data to the NOC,
- wherein the vehicle network device is able to generate a polling signal to poll at least one of a plurality of base stations communicatively coupled to the NOC to request access to the NOC, the communication device further being able to send the data to the NOC by progressively establishing a wireless communication with and sending the data to at least some of the base stations within a wireless range of the vehicle that are assigned to the vehicle by the NOC, and
- wherein the vehicle network device is further able provide upload data, sent from at least one of the base stations assigned to the vehicle by the NOC, to one of the plurality of disparate units in the vehicle.

35. The system of claim 34 wherein at least one of the base stations is a wireless mobile base station.

36. The system of claim 34 wherein the vehicle is an aircraft, and wherein the communication device can send the data to the NOC by sending the data during flight of the aircraft in response to a request for the data from the NOC.

37. The system of claim 34 wherein the vehicle network device is able to perform an authorization process with a polled base station associated with a strongest received signal strength (RSS), the vehicle network device further being able to progressively establish wireless communication from a current base station to a next base station within the wireless range if a mean RSS of the next base station is increasing and exceeds a mean RSS of the current base station.

38. The vehicle data services communication system according to claim 1 wherein said wireless link transmissions of data to said at least one vehicle include a non-time deterministic transfer of non-time constrained data types.

39. The vehicle data services communication system of claim 19 wherein said wireless link transmissions of data from said at least one vehicle include a non-time deterministic transfer of non-time constrained data types.

40. The system of claim 34 wherein said spread spectrum technique to send said data to said NOC includes a non-time deterministic transfer of non-time constrained data types.

\* \* \* \* \*